(12) United States Patent
Klingseis

(10) Patent No.: US 6,898,933 B2
(45) Date of Patent: May 31, 2005

(54) METHOD FOR DETERMINING A BOOST PRESSURE SETPOINT IN AN INTERNAL COMBUSTION ENGINE WITH AN EXHAUST GAS TURBOCHARGER

(75) Inventor: Bernhard Klingseis, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/629,902

(22) Filed: Jul. 30, 2003

(65) Prior Publication Data

US 2004/0128996 A1 Jul. 8, 2004

(30) Foreign Application Priority Data

Jul. 31, 2002 (DE) .......................................... 102 35 013

(51) Int. Cl.[7] .............................................. F02D 23/00
(52) U.S. Cl. ....................................................... 60/602
(58) Field of Search ................................... 60/600–603

(56) References Cited

U.S. PATENT DOCUMENTS

| | | | | |
|---|---|---|---|---|
| 3,941,035 A | * | 3/1976 | Mueller | 60/602 |
| 4,286,433 A | * | 9/1981 | Detweiler | 60/602 |
| 4,597,264 A | * | 7/1986 | Cipolla | 60/602 |
| 4,748,567 A | * | 5/1988 | Sumizawa et al. | 60/602 |
| 5,121,604 A | * | 6/1992 | Berger et al. | 60/602 |
| 5,600,956 A | * | 2/1997 | Nytomt | 60/602 |
| 5,755,101 A | * | 5/1998 | Free et al. | 60/602 |
| 5,899,069 A | * | 5/1999 | Watanabe | 60/602 |
| 5,960,631 A | * | 10/1999 | Hayashi | 60/602 |
| 6,619,261 B1 | * | 9/2003 | Wang et al. | 60/602 |

* cited by examiner

Primary Examiner—Thai-Ba Trieu
(74) Attorney, Agent, or Firm—Morrison & Foerster LLP

(57) ABSTRACT

The invention relates to a method for determining a boost pressure in an internal combustion engine having an exhaust gas turbocharger in which a wastegate is actuated via the compressed boost air. Since a basic force is required in order to enable actuation of the wastegate, the setpoints for the boost pressure are limited to a minimum value.

7 Claims, 3 Drawing Sheets

US 6,898,933 B2

METHOD FOR DETERMINING A BOOST PRESSURE SETPOINT IN AN INTERNAL COMBUSTION ENGINE WITH AN EXHAUST GAS TURBOCHARGER

CLAIM FOR PRIORITY

This application claims priority to International Application No. 10235013.2 which was filed in the German language on Jul. 31, 2002, which is hereby incorporated by reference.

TECHNICAL FIELD OF THE INVENTION

The present invention relates to a method for determining a boost pressure setpoint in an internal combustion engine, and in particular, an internal combustion engine with an exhaust gas turbocharger.

BACKGROUND OF THE INVENTION

In combustion engines with exhaust gas turbochargers and wastegate, the boost pressure is controlled through the bypass in the exhaust gas duct being opened or closed to varying degrees. The exhaust gas mass flow through the turbine, and hence the turbine power output, varies depending on the position of the wastegate. Depending on the varying turbine power output there is a change in the compressor power output and hence the boost pressure.

SUMMARY OF THE INVENTION

The present invention relates to a method for determining a boost pressure setpoint in an internal combustion engine, and in particular, an internal combustion engine with an exhaust gas turbocharger which has a bypass line running parallel to the turbine in the exhaust gas duct, the bypass line having a wastegate which is set via a pneumatically operated actuator.

The invention also relates to types of internal combustion engines in which the pressure actuator for the wastegate is controlled pneumatically by means of air from the compressor. As a result of this control of the pressure actuator, a situation can arise in which there is not sufficient boost pressure present to control the wastegate. In this case, the boost pressure is no longer sufficient to open the wastegate, with the result that the power output from the compressor cannot be reduced.

The invention provides a method for controlling the boost pressure, particularly to provide a boost pressure setpoint, in an internal combustion engine in order to enable reliable and stable control of the boost pressure.

In one embodiment according to the invention, the setpoint for the boost pressure is limited to a minimum value when the wastegate is deactivated. According to the invention, the minimum value is made up of the sum of the environmental pressure and one or more pressure constants. In the invention, the control of the internal combustion engine is limited to the extent that a minimum setpoint for the boost pressure is determined. The minimum value depends on the environmental pressure, the setpoint for the boost pressure not being less than the environmental pressure. The further pressure constants which are taken into account for determining the minimum pressure are dependent on the actual design of the exhaust gas turbocharger, more particularly of the actuator for the wastegate. The invention maintains the boost pressure at a minimum pressure which provides a certain basic power for the system.

The basic power ensures that the wastegate is in a closed state such that a sufficiently large pressure is built up in front of the turbine wheel so that the turbine power output which is then delivered is great enough to produce an increase in pressure in the compressor which is used mainly to boost the internal combustion engine but also acts in turn as control pressure for the actuator.

Another embodiment of the invention determines the basic boost pressure which is produced even when the wastegate is actuated via, for example, an electrical or hydraulic wastegate actuator or a pressure actuator which is open in the pressureless state. In these cases, an increase in pressure will generally arise via the wastegate, leading to an undesirable boost pressure (basic boost pressure). This increase in pressure is explained also by the throttle effect of the open wastegate.

In a preferred embodiment of the invention, a speed-dependent basic value is added to the environmental pressure. The speed-dependent basic value is preferably generated by a characteristic curve recorded for a reference system.

An additional pressure constant is preferably determined with the throttle valve open and the wastegate closed, the additional pressure constant being added to the value for the environmental pressure and the basic value. The additional pressure constant ensures that the setpoint does not drop so far that no further control can be effected.

In a preferred embodiment of the invention, the additional pressure constant is corrected adaptively as a function of the measured boost pressure. The adaptive correction of the additional pressure constant ensures that the difference between boost pressure actual value and boost pressure setpoint does not diverge as a result of a limitation over time.

A diaphragm box which is controlled by overpressure and underpressure and which is mechanically linked to the wastegate is preferably used as an actuator for the wastegate. Pressure can be applied to different sides of a diaphragm box of this type, with the result that the movement of the diaphragm is converted into the setting of the wastegate. The pressure box is preferably pretensioned toward the closed wastegate position.

BRIEF DESCRIPTION OF THE DRAWINGS

Exemplary embodiments of the invention are explained in more detail below with reference to the drawings, in which.

DETAILED DESCRIPTION OF THE INVENTION

Figure 1:
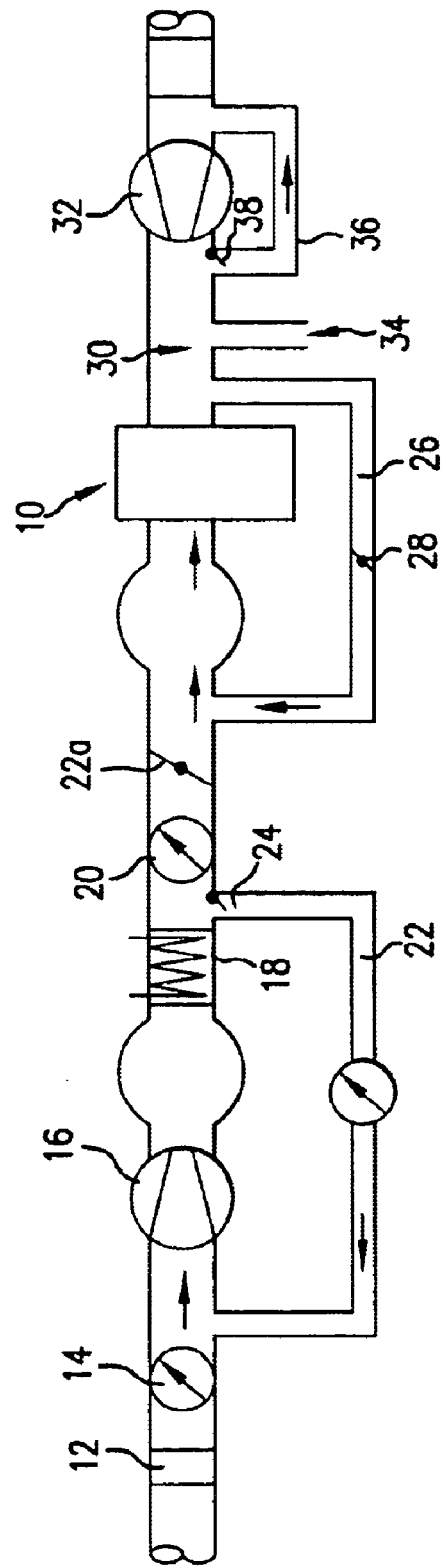
FIG. 1 shows a schematic view of an internal combustion engine with exhaust gas turbocharger.

FIG. 1 shows a schematic view of an internal combustion engine 10. At the beginning of the intake duct the incoming air is filtered (air filter 12) and can be measured via an air mass sensor 14. A turbocharger compressor 16 is placed downstream in the intake duct, followed by a boost air cooler 18 and optionally by a second air mass sensor 20. A reflow channel 22 is provided parallel to the compressor 16. The reflow channel 22 is varied in terms of its throughflow rate via a reflow flap 24 which may also be implemented as a reflow valve.

Located downstream from the second air mass sensor 20 is a throttle valve 22a which controls the air mass entering the internal combustion engine 10. The second air mass sensor 20 also is merely optional. A proportion of exhaust gas can be mixed with the compressed air introduced into the internal combustion engine via an exhaust gas recirculation unit 26. The exhaust gas proportion is dependent on the position of an exhaust gas recirculation valve 28.

An exhaust gas turbine 32 is provided in the exhaust gas duct 30. It is understood that the exhaust gas turbine 32 is mechanically linked to the compressor 16, wherein the power extracted from the exhaust gases is converted with mechanical losses into a compressor power output 16. An additional secondary air inlet 34 can be provided up-stream of the turbine 32.

Provided in the exhaust gas duct 30 and running parallel to the turbine 32 is a bypass line 36, through which parts of the exhaust gases or mixture of exhaust gases and secondary air can be directed past the turbine 32. The amount of air directed past is determined by a wastegate 38. If the wastegate 38 is closed, this leads to a maximum exhaust gas flow through the turbine 32, which then leads to a maximum compression of the fresh air in the intake duct. The boost pressure is increased as a result. If, on the other hand, the wastegate 38 is opened to the maximum, as many exhaust gases as possible flow through the bypass channel 36, whereupon the turbine power taken up by the turbine 32 drops. In parallel with this there is a decrease in the power delivered by the compressor 16 and consequently in the boost pressure.

Figure 2:
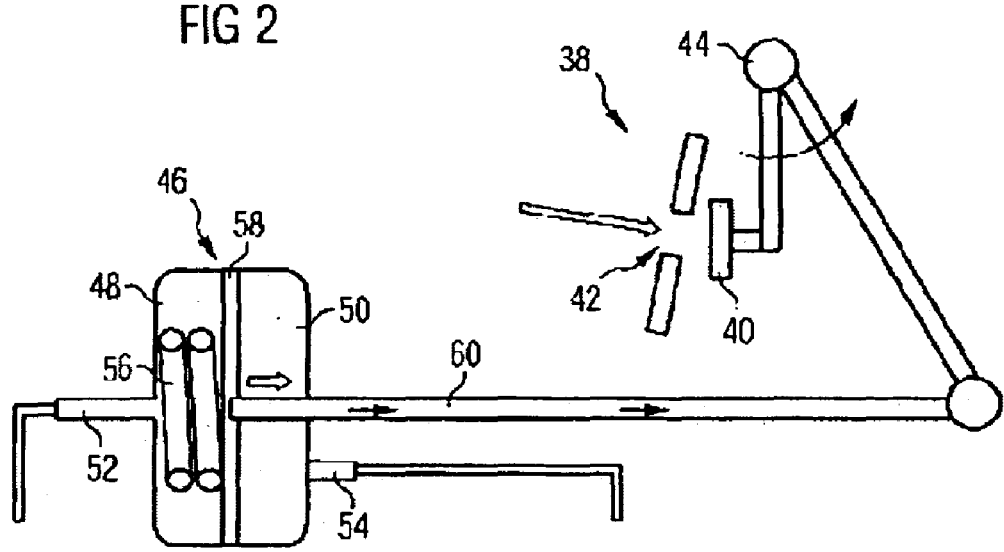
FIG. 2 shows a schematic view of a wastegate with pressure diaphragm box.

FIG. 2 shows the actuation of the wastegate 38 in schematic form. The wastegate 38 possesses a wastegate flap 40 which covers an inlet opening 42. Toward that end, the wastegate flap 40 is mounted about a swiveling axis 44.

The varying distance between the wastegate flap 40 and the opening 42 produces a reduced throughflow area in terms of flow rate, with the result that a varyingly large proportion of the exhaust gases flows through the bypass line 36.

The wastegate flap 40 is mechanically linked to a diaphragm box 46. The diaphragm box 46 has two mutually separate chambers 48 and 50 to which pressure is applied via the lines 52 and 54. Additionally provided in the chamber 48 is a spring 56 which is in contact with a diaphragm 58 separating the chambers 48 and 50. The diaphragm 58 is linked to the wastegate flap 40 on the side facing the chamber 50 via a push rod 60. In response to an actuation of the push rod 60 the retainer arm of the wastegate flap 40 swivels about the swiveling axis 44.

In the position in which pressure is not applied, the diaphragm 58 is pretensioned by the spring 56 such that the spring resistance and the power of the exhaust gases flowing through the opening 42 act upon the throttle valve 40. The wastegate position results from the equilibrium of forces arising from spring resistance 56 and exhaust gas pressure force.

If a pressure difference is now applied to the two chambers, the pressure force exerted on the wastegate flap 40 increases or reduces, leading told change in the position of the throttle valve. Pressure is applied to the chambers of the diaphragm box for example by means of timing valves which are controlled by means of pulse width modulation. The timing valves can be designed such that they switch back and forth between a high pressure value, for example the boost pressure, and a low pressure value, for example the environmental pressure. In an alternative embodiment it is also conceivable that operation switches back and forth between a low pressure value, for example lower than the environmental pressure, and the environmental pressure or a higher pressure value. Thanks to the pulse width modulation, virtually any pressure value between the low and the high pressure value can be applied to each chamber.

Figure 3:
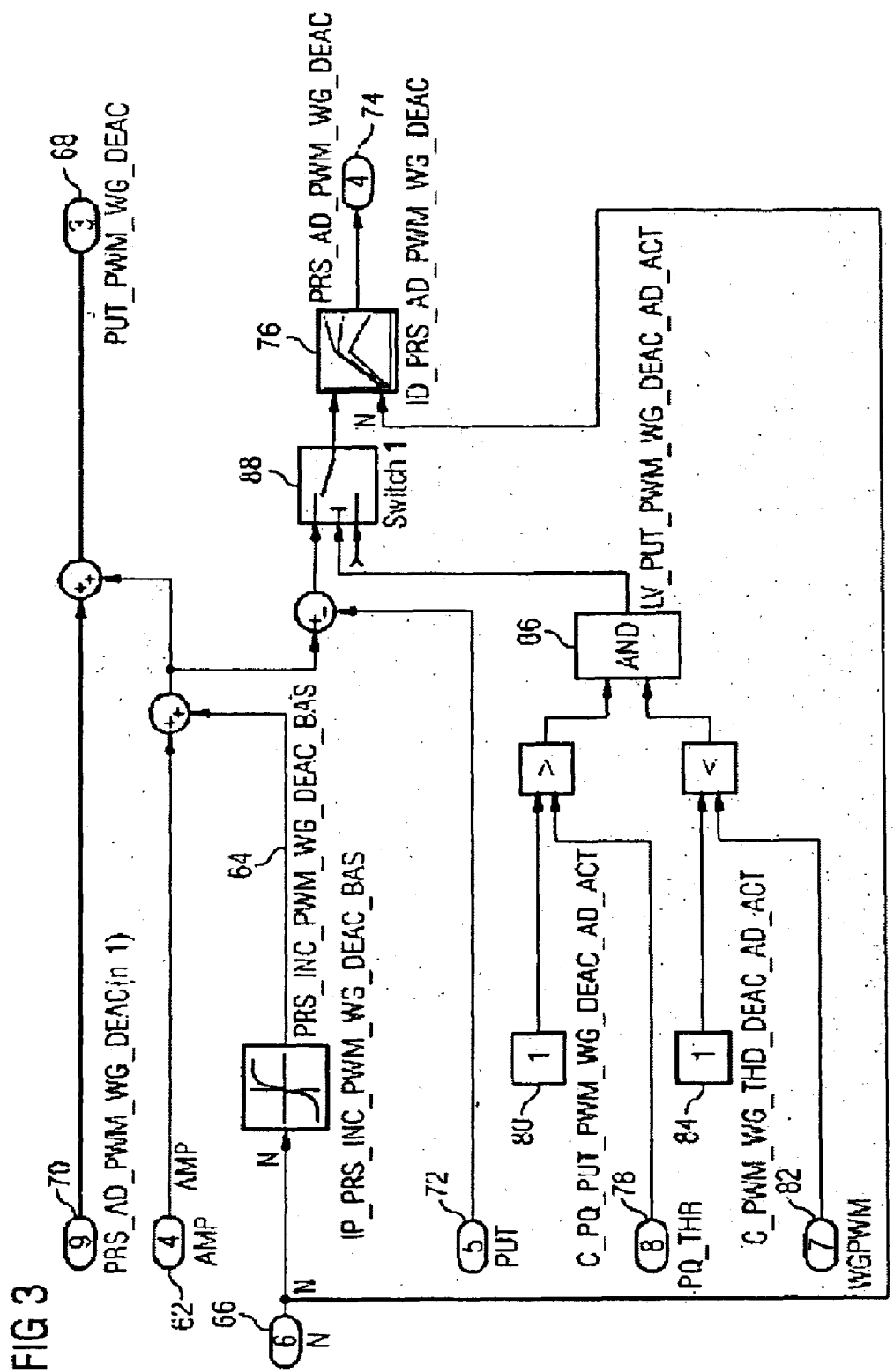
FIG. 3 shows the invention as a block diagram.

FIG. 3 shows the execution sequence of the method according to the invention. A value of a basic boost pressure 64 is added to a measured value of the environmental pressure 62. The basic value is determined with the aid of a reference system and is dependent on the speed 66. The sum of environmental pressure and basic value leads to a minimum value 68 for the boost pressure. An additional pressure constant 70 is added to the sum of the values 62 and 64. The additional pressure constant 70 is determined iteratively, so that in the illustrated nth step of the method the additional pressure constant from the (n−1)th iteration step is added.

The minimum boost pressure value 68 ensures that when the timing valves are used there is a sufficient pressure difference between boost pressure and environmental pressure to ensure that the wastegate flap can be controlled.

In order to determine the additional pressure constant, the sum of environmental pressure and basic value is reduced by the current boost pressure 72. The additional pressure constant 74 for the nth step is formed from the standard deviation formed in this way as a function of the speed 66. For this purpose the pressure constants are stored in a characteristic map 76.

The additional pressure constant 74 is determined in the case where both the throttle valve 22a is open and there is control of the timing valves. This condition is specified by the pressure quotient 78 at the throttle valve. The condition for the open throttle valve 22a results in this case from the fact that the pressure quotient at the throttle valve 22a is greater than a predetermined constant. By suitable redefinition of the pressure quotient it is of course possible that this condition can also be formulated as a comparison to determine whether the pressure ratio is less.

The control of the timing valves is determined in that their control signal 82 is compared with a constant 84. The additional pressure constant 74 is calculated in the case where the throttle valve 22a is open and the actuator for the wastegate is controlled via the control valves. To this end, both conditions are applied to a switch 86 via a logical AND operation. If a signal is present at the center input of the switch 88, the control difference is forwarded to the characteristic map 76. If not, the determination of the additional pressure constant is omitted.

Figure 4:
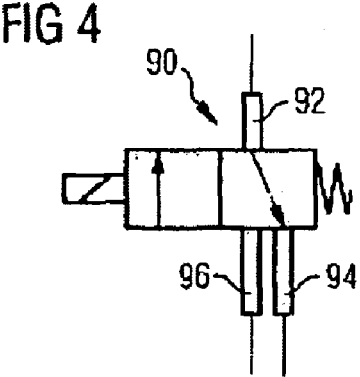
FIG. 4 shows a schematic view of a switching valve.

FIG. 4 shows an example of a timing valve 90 which can be used to apply different pressures to the chambers 48 and 50. In the position shown in FIG. 4, the output line 92 of the timing valve 90, which operates according to the principle of a switching valve with two inputs and one output, is linked to its input line 94. In the second setting, the input line 96 is linked to the output line 92. If different pressures are now applied to the two input lines 94 and 96, any intermediate value can be generated at the output line 92 by means of appropriate switching back and forth between the first and the second position.

What is claimed is:

1. A method for determining a boost pressure setpoint in an internal combustion engine comprising an exhaust gas turbocharger having a bypass line running parallel to a turbine in an exhaust gas duct, the bypass line having a wastegate which is set via a pneumatically, hydraulically or electrically operated actuator, comprising:

limiting the setpoint for the boost pressure to a minimum value; and determining the minimum value from the sum of environmental pressure and one or more pressure constants, wherein, with a throttle valve deactivated and the wastegate closed, an additional pressure constant is determined and then added to the environmental pressure and the basic value.

2. The method according to claim 1, wherein a speed-dependent basic value is added as a pressure constant to the environmental pressure.

3. The method according to claim 1, wherein the additional pressure constant is adaptively corrected as a function of the measured boost pressure.

4. The method according to claim 3, wherein the additional basic pressure constant increases the boost pressure setpoint if the measured boost pressure is lower than the sum of environmental pressure and basic value.

5. The method according to claim 1, wherein a diaphragm box controlled by overpressure and underpressure is provided as an actuator for the wastegate, the diaphragm box being mechanically linked to the wastegate.

6. The method according to claim 5, wherein the diaphragm box is pretensioned by means of a spring into a position that closes the wastegate.

7. An internal combustion engine, comprising:

an exhaust gas turbocharger having a bypass line running parallel to a turbine in an exhaust gas duct, the bypass line having a wastegate which is set via a pneumatically, hydraulically or electrically operated actuator to limit the setpoint for a boost pressure to a minimum value, and to determine the minimum value from the sum of environmental pressure and one or more pressure constants, wherein, with a throttle valve deactivated and the wastegate closed, an additional pressure constant is determined and then added to the environmental pressure and the basic value.

* * * * *